United States Patent [19]

Kondis et al.

[11] Patent Number: 4,808,231

[45] Date of Patent: Feb. 28, 1989

[54] INHIBITIVE TREATMENT FOR ALUMINUM PIGMENTS

[75] Inventors: Tom Kondis, Pittsburgh; Pamela Claassen, Lower Burrell, all of Pa.

[73] Assignee: Silberline Manufacturing Co., Inc., Lansford, Pa.

[21] Appl. No.: 152,849

[22] Filed: Feb. 5, 1988

Related U.S. Application Data

[63] Continuation of Ser. No. 652,724, Sep. 21, 1984, abandoned.

[51] Int. Cl.$^4$ ................................................. C09D 5/10
[52] U.S. Cl. ................................ 106/404; 106/14.12; 106/403; 106/503
[58] Field of Search ............... 106/308 Q, 308 B, 290, 106/1.18, 14.12, 1.19, 1.21, 1.05, 1.12, 1.13, 1.14, 1.16, 1.17

[56] References Cited

U.S. PATENT DOCUMENTS 4,350,535 9/1982 Ishijima et al. ..................... 106/290
4,453,982 6/1984 Wilfinger et al. .............. 106/308 M

OTHER PUBLICATIONS

Derwent Abstract, Accession No. 83-816681/48, Japanese Patent No. J58-168670, Oct. 5, 1983.
Derwent Abstract, Accession No. 84-178713/29, Japanese Patent No. J59-098168, Jun. 6, 1984.

*Primary Examiner*—Amelia Burgess Yarbrough
*Attorney, Agent, or Firm*—Wegner & Bretschneider

[57] ABSTRACT

Organic phosphate or organic phosphite reagent compounds are employed to treat metallic particles, especially aluminum pigments, to protect their surfaces against chemical attack by water. Such treated particles are suitable for incorporation into aqueous-based coating systems.

10 Claims, No Drawings

INHIBITIVE TREATMENT FOR ALUMINUM PIGMENTS

This application is a continuation of U.S. application Ser. No. 652,724, filed Sep. 21, 1984, now abandoned.

BACKGROUND OF THE INVENTION

Air purity standards which limit emissions into the atmosphere have induced paint manufacturers to develop coating systems with a minimum quantity of organic solvents. One approach toward this end has been the substitution of water for organic solvents and diluents. Metallic aluminum pigments, which are used extensively in organic-based coatings such as decorative automotive top coats, asphaltic roof coatings and metallic maintenance paints, readily react chemically with water to produce hydrogen gas and aluminum hydroxide as indicated by the chemical equation:

$$2Al + 6H_2O \rightarrow 2Al(OH)_3 + 3H_2$$

This reaction not only destroys the unique metallic pigmentation properties of the tiny aluminum mirror-like particles by converting them to a hydrated oxide form unsuitable for pigment use, but it also generates hydrogen gas, which is a fire and explosion hazard.

SUMMARY OF THE INVENTION

The present invention resides in the discovery that the aforesaid Al-$H_2O$ reaction can be substantially inhibited by treating the aluminum pigments with compounds whose molecules consist of an inorganic segment capable of reaction with, or absorbing on, the aluminum surface, plus an organic segment consisting of one or more chains having 2 or more consecutive carbon atoms. Organic-substituted phosphoric acid compounds (organic phosphates) and phosphorous acid compounds (organic phosphites) are particularly suited for this purpose.

DETAILED DESCRIPTION OF THE INVENTION

In addition to the principal consideration for protecting the aluminum pigments against reaction with water, other considerations include treatment cost and ease of dispersing the treated pigment into water-based coatings systems.

Aluminum pigments are typically manufactured in rotating, steel, cylindrical ball mills with steel balls as grinding media. The aluminum charge consists of particles (atomized, chopped scrap or shredded foil) carried in an organic diluent, most typically mineral spirits or other inert hydrocarbon liquids. A small amount of milling lubricant, such as a fatty acid, is also present. Following the milling operation, the aluminum pigment slurry is filtered to remove the bulk of the diluent; this filtrate is generally reused in ball mills. The filter cake typically consists of 75%–85% by weight aluminum pigment, 15%–25% organic liquid diluent and 1%–3% residual lubricant. This filter cake sometimes has a dry, dusty or grainy appearance, and is not normally sold commercially in this state. Instead, aluminum pigment manufacturers typically reduce this cake to a smooth paste of uniform aluminum composition, usually in the 60%–75% range depending on the pigment grade, by adding back the proper amount of a suitable liquid in a paste mixer (sigma blade or similar). The uniform paste product is then packaged for sale.

A compound useful for the subsequent inhibition of the Al-$H_2O$ reaction can be added to the paste mixer along with the aluminum filter cake and other ingredients normally added, thus minimizing added treatment costs. While these reaction-inhibiting compounds may be administered in other ways, as, for example, in the ball mill or in separate treatment equipment, the paste mixer technique is particularly effective. Separate equipment requires additional capital equipment costs plus the expense of extra handling operations; while ball mill additions result in contamination of the filtrate by the reaction-inhibiting compound, thereby limiting its reuse potentialities or requiring purification operations for filtrate recovery. While these procedures may be effective, therefore, they are not economically preferred.

Organic-substituted phosphoric acid compounds (organic phosphates) and organic-substituted phosphorous acid compounds (organic phosphites) effectively inhibit the Al-$H_2O$ reaction. Effective organic phosphates include commercial products sold under the trade name Virco-Pet by Mobil Chemical, and those sold under the trade name Wayfos by Wayland Chemical. Effective organic phosphites inlcude those compounds sold under their general chemical names by Mobil Chemical (various alkyl phosphites).

The inorganic segment of these effective reagents is believed to anchor the molecules in place at the aluminum surfaces, either through chemical reaction or through strong sorptive forces. The organic segment is necessary to protect the aluminum surfaces against subsequent attack by water, although the mechanism for this protection is not clear. For example, phosphoric acid itself does not effectively inhibit the Al-$H_2O$ reaction.

Other reagent molecules fulfilling the requirements for a suitable organic segment can be used to anchor the molecule to the aluminum surface, along with an organic segment to inhibit subsequent reaction of Al with $H_2O$. Organic derivatives of chrome complexes, sold commercially under the trade names QUILON and VOLAN by DuPont, for example, are reasonable candidates for inhibiting the Al-$H_2O$ reaction. However, disposal problems associated with chromium compounds make these a less desirable choice, both for the manufacturer and for the customer.

Treatment in a paste mixer allows efficient use of the reagent; that is, the exact quantity required for subsequent inhibition of the Al-$H_2O$ reaction may be added without waste. Quantities less than about 2% by weight, based on the weight of aluminum present, are generally insufficient for effectiveness; whereas quantities greater than approximately 15% add to the product cost without adding comparable effectiveness. Therefore, the preferred range is 2%–15% by weight of the aluminum present. A balance of economic considerations (reagent costs) with assurance of adequate protection, however, suggests a most preferable reagent concentration range of 5%–10%.

The organic segment of the reagent molecule may either assist or hinder migration of the molecule through the organic diluent retained in the cake, to the aluminum surface. Where this migration is blocked through incompatibility, or mutual insolubility, of the organic diluent and reagent, effective protection of the aluminum pigments is not achieved. Mixing time in the paste mixer is typically 5 minutes to one hour, and is not critical to subsequent effectiveness. However, sufficient time is required to allow reagent molecules to diffuse to the aluminum surfaces and to assume their naturally preferred orientations thereon. This diffusion and orientation is essentially complete within 2-4 weeks after mixing, and creates no manufacturing hardships because it occurs under ambient conditions in the product packages during shipping and storage. The reagent may be pre-dissolved in the letdown liquids employed in reducing the filter cake to paste, in order to assist the diffusion and orientation process.

Treatment in a paste mixer has the further advantage of allowing convenient addition of surfactants, dispersants or coupling solvents while reducing the cake to commercial paste form. These additions may be desirable in rendering the treated aluminum pigment more easily dispersible in a customer's aqeuous system. The organic diluent and residual lubricant remaining in the aluminum filter cake after ball milling normally leaves the aluminum pigment product difficult to disperse in aqueous systems, but this problem can be overcome by addition of proper dispersing aids well known to the industry.

In order to quickly assess the effectiveness of a candidate reagent, a test has been devised to accelerate attack of the treated aluminum pigments by water, and to therefore assess the degree to which the aluminum surface is protected. A sample containing 1.0 gram aluminum is weighed into a test tube, and 25 milliliters 0.01M sodium tetraborate solution, $Na_2B_4O_7$ in water, is added (pH in the 9-10 range, slightly basic). The test tube is fitted with a rubber stopper and is connected by flexible tubing to an inverted, water-filled buret. The test tube is then inserted into an oil bath maintained at 140° C., and one hour is allowed for expansion of the head space gases and temperature equilibration of the test slurry. Thereafter, the volume of $H_2$ gas generated by reaction of the aluminum is measured by displacement of the water in the buret. This is an extremely aggressive test, and is hereinafter referred to as the "Borax Test". By way of comparison, unprotected aluminum particles will react completely within 7 hours in the Borax Test (one hour equilibration period plus six hours measured $H_2$ evolution); whereas these same aluminum particles react to an insignificant degree in neutral water (pH=7) or under slightly acidic conditions (pH in the 5-6 range).

EXAMPLE 1

Alcoa pigment grade 7370, described by the manufacturer as a "highly corrosion resistant aluminum pigment" and typically used in metallic paint finishes for automobiles, was employed in cake form for this example. This cake consisted of 80% by weight aluminum pigment, residual milling lubricant and approximately 20% by weight mineral spirits. Portions of this cake were reduced to 65% (metal content) paste in a paste mixer using a small quantity of Atlas G3300 surfactant (an alkyl aryl sulfonate) and butyl cellosolve coupling solvent. The inhibitive reagents identified in Table 1 replaced a portion of the coupling solvent. The product pastes dispersed easily in the Borax Test solution. Volumes of $H_2$ generated over a 6-hour period, following one hour allowed for thermal equilibration, are summarized in Table 1. The treatments had no significant effect on optical properties of the treated pigments.

TABLE 1

| 7370 Cake Adjusted to Paste | |
|---|---|
| Treatment | ml $H_2$ Generated, 6 Hour Borax Test |
| 3% Wayfos M100 | 12 |
| 3% Dioctyl phosphite | 10 |
| None (control) | >200 |
| 87370 Hydropaste | >200 |

The organic phosphate (Wayfos M100) and organic phosphite treatments clearly inhibit the $Al-H_2O$ reaction induced by this extremely aggressive test. A sample of Alcoa grade 87370 Hydropaste, Alcoa's commercially available water-stable equivalent to grade 7370, is included in this table for comparison. Alcoa's Hydropastes contain nitropropane in place of the coupling solvent employed in this example, plus G3300 surfactant, and are described more fully in U.S. Pat. No. 2,848,344, issued Aug. 19, 1953 to Melvin H. Brown. It is clear from this data that Alcoa's most water-resistant product line is not sufficiently stable to withstand the aggressive Borax Test.

EXAMPLE II

In this example, samples of 7370 cake were slurried in various organic liquids and commercial organic phosphates were added. The slurry was heated to reflux for 2 hours while stirring, then was cooled and filtered. The product cake was subjected to the Borax Test.

TABLE 2

| Reflux Treatments of 7370 | | | |
|---|---|---|---|
| Organic Phosphate | Amount Present (on Al wt.) | Reflux Solvent | ml $H_2$ Generated, 6 Hour Borax Test |
| Wayfos M100 | 10% | n-propanol | >200 |
| Wayfos M100 | 50 | n-propanol | 83 |
| Wayfos M100 | 50 | mineral spirits | 37 |
| Wayfos M100 | 50 | methyl cellosolve acetate | 26 |
| Wayfos M10N | 50 | n-propanol | 103 |
| Wayfos M10N | 50 | mineral spirits | 75 |

It is apparent that reflux treatment is less effective than the preferred paste-mixing technique. Also, more reagent is required, and more is wasted in the filtrate.

EXAMPLE III

In this example, a small amount of Atlas G3300 surfactant was manually stirred into Alcoa automotive tinting paste grade 7470 along with the reagent, using a minimum amount of mixing. The treated samples were allowed to set at room temperature for a period of 4 weeks to allow diffusion and orientation of the reagent. Borax Test results are summarized in Table 3. Grade 7470 is similar in corrosion resistance, tinting strength and particle size distribution to Alcoa grade 7370.

TABLE 3

| 7470 Hand-Mixed Paste | | |
|---|---|---|
| Reagent | Solubility in Mineral Spirits | ml $H_2$ Generated, 6 Hour Borax Test |
| 5% Virco-Pet 20 | Soluble | 2 |
| 5% Virco-Pet 30 | Insoluble | >800 |
| 5% Dioleyl hydrogen phosphite | Soluble | 2 |
| 5% Dilauryl hydrogen phosphite | Soluble | 2 |

The insoluble organic phosphate (Virco-Pet 30) could not diffuse through the mineral spirits phase of the pigment paste to provide protection to the aluminum surfaces. The soluble organic phosphate (Virco-Pet 20) and orgaic phosphites, on the other hand, provide adequate protection with a minimum of mixing.

Although the invention has been shown in connection with a certain specific embodiment, it will be readily apparent to those skilled in the art that various changes in form and composition may be made to suit requirements without departing from the spirit and scope of the invention.

I claim as my invention:

1. A coating composition comprising:
    metal pigment particles;
    a suitable aqueous-based carrier for forming a coating composition; and
    an organic phosphite present in an amount sufficient to inhibit reaction between the metal pigment particles and water.

2. A composition as claimed in claim 1 wherein the metal particles are aluminum.

3. A paste as claimed in claim 2 wherein the organic phosphate compounds are present in the amount of 2%–15% by weight of metal present.

4. The composition of claim 1, wherein the organic phosphite is an alkyl-substituted phosphite.

5. The composition of claim 4, wherein the alkyl-substituted phosphite is at least one member selected from the group consisting of dilauryl hydrogen phosphite, dioctyl hydrogen phosphite and dioleyl hydrogen phosphite.

6. A paste useful for forming a coating composition when mixed with a suitable aqueous-based carrier, comprising:
    metal pigment particles; and
    an organic phosphite present in an amount sufficient to inhibit reaction between the metal pigment particles and water.

7. The paste of claim 6, wherein the metal particles are aluminum.

8. The paste of claim 6, wherein the organic phosphite is an alkyl-substituted phosphite.

9. The paste of claim 8, wherein the alkyl-substituted phosphite is at least one member selected from the group consisting of dilauryl hydrogen phosphite, dioctyl hydrogen phosphite and dioleyl hydrogen phosphite.

10. The paste of claim 3, wherein the amount is five to ten percent by weight.

* * * * *

UNITED STATES PATENT AND TRADEMARK OFFICE
CERTIFICATE OF CORRECTION

PATENT NO. : 4,808,231

DATED : February 28, 1989

INVENTOR(S) : Tom KONDIS et al.

It is certified that error appears in the above-identified patent and that said Letters Patent is hereby corrected as shown below:

IN THE SPECIFICATION:

Column 5, line 5, change "orgaic" to --organic--.

IN THE CLAIMS:

Claim 3, line 1, change "claim 2" to --claim 6--;

line 2, change "phosphate" to --phosphite--.

Claim 10, line 2 after "weight", insert --of metal present--.

Signed and Sealed this

Fifteenth Day of May, 1990

Attest:

HARRY F. MANBECK, JR.

Attesting Officer     Commissioner of Patents and Trademarks